United States Patent
Lee et al.

(10) Patent No.: US 10,298,736 B2
(45) Date of Patent: May 21, 2019

(54) APPARATUS AND METHOD FOR PROCESSING VOICE SIGNAL AND TERMINAL

(71) Applicant: ELECTRONICS AND TELECOMMUNICATIONS RESEARCH INSTITUTE, Daejeon (KR)

(72) Inventors: Min Kyu Lee, Daejeon (KR); Sang Hun Kim, Daejeon (KR); Young Ik Kim, Daejeon (KR); Dong Hyun Kim, Seoul (KR); Mu Yeol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/202,912

(22) Filed: Jul. 6, 2016

(65) Prior Publication Data

US 2017/0013105 A1    Jan. 12, 2017

(30) Foreign Application Priority Data

Jul. 10, 2015 (KR) .................. 10-2015-0098384
Jun. 20, 2016 (KR) .................. 10-2016-0076806

(51) Int. Cl.
*H04M 1/60* (2006.01)
*G10L 21/02* (2013.01)
*H04M 1/725* (2006.01)
*G10L 15/20* (2006.01)
*G10L 25/78* (2013.01)
*G10L 15/30* (2013.01)

(52) U.S. Cl.
CPC ....... *H04M 1/7253* (2013.01); *G10L 21/0202* (2013.01); *H04M 1/6066* (2013.01); *G10L 15/20* (2013.01); *G10L 15/30* (2013.01); *G10L 25/78* (2013.01); *H04M 2201/40* (2013.01)

(58) Field of Classification Search
USPC .............................. 704/270–278; 455/114.2
See application file for complete search history.

(56) References Cited

U.S. PATENT DOCUMENTS 6,574,247 B1 * 6/2003 Baggen ............... H03M 13/353
                                                        370/473
8,326,240 B1 * 12/2012 Kadambe ........... H04B 1/70735
                                                        455/114.2
9,445,209 B2 * 9/2016 Dadu ..................... G06F 3/167
(Continued)

FOREIGN PATENT DOCUMENTS

JP          4940956 B2      5/2012
KR    10-2010-0119250 A    11/2010
(Continued)

*Primary Examiner* — Abul K Azad
(74) *Attorney, Agent, or Firm* — LRK Patent Law Firm

(57) ABSTRACT

A voice signal processing apparatus includes: an input unit which receives a voice signal of a user; a detecting unit which detects an auxiliary signal; and a signal processing unit which transmits the voice signal to an external terminal in a first operation mode and transmits the voice signal and the auxiliary signal to the external terminal using the same or different protocols in a second operation mode.

9 Claims, 5 Drawing Sheets

(56) References Cited

U.S. PATENT DOCUMENTS

| | | | |
|---|---|---|---|
| 2006/0160564 A1* | 7/2006 | Beamish | H04B 1/3805 |
| | | | 455/553.1 |
| 2008/0163747 A1 | 7/2008 | Uehara | |
| 2008/0188181 A1 | 8/2008 | Choi et al. | |
| 2012/0156997 A1* | 6/2012 | Kim | H04W 8/005 |
| | | | 455/41.2 |
| 2015/0100322 A1* | 4/2015 | Lee | H04N 5/4403 |
| | | | 704/275 |
| 2015/0327001 A1* | 11/2015 | Kirshenberg | H04W 28/18 |
| | | | 455/41.2 |
| 2016/0080896 A1* | 3/2016 | Song | H04W 4/008 |
| | | | 455/41.2 |
| 2017/0024467 A1* | 1/2017 | Sharma | G06T 1/0064 |

FOREIGN PATENT DOCUMENTS

| | | |
|---|---|---|
| KR | 10-2014-0135569 A | 11/2014 |
| KR | 10-2015-0026754 A | 3/2015 |

\* cited by examiner

APPARATUS AND METHOD FOR PROCESSING VOICE SIGNAL AND TERMINAL

CROSS-REFERENCE TO RELATED APPLICATIONS

This application claims priority to the benefit of Korean Patent Application No. 10-2015-0098384 filed in the Korean Intellectual Property Office on Jul. 10, 2015 and No. 10-2016-0076806 filed in the Korean Intellectual Property Office on Jun. 20, 2016, the entire contents of which are incorporated by reference.

BACKGROUND OF THE INVENTION

1. Field of the Invention

The present invention relates to a voice signal processing apparatus, a voice signal processing method, and a terminal.

2. Description of Related Art

An apparatus which provides a voice recognizing service, such as a smart phone or a personal computer of the related art, uses a PC microphone, a smart phone microphone, or a Bluetooth headset as a tool which transmits a voice of a speaker to a voice recognizing terminal. Among the tools, the Bluetooth headset is only worn to an ear without using a separate cable, so that very convenient for the user to use the Bluetooth headset. Therefore, the Bluetooth headset is widely used.

However, phone or the Bluetooth heads is vulnerable to a voice from another person or ambient noise other than the voice of the speaker. In order to remove the ambient noise, a signal processing process is performed on the voice signal and the voice signal is transmitted to the voice recognizing terminal in some cases. However, in this case, only mono channel information in which the signal processing is completed is transmitted, so that additional post processing by software cannot be performed. Further, the voice of the other party of the communication is input to the microphone of the user as it is which may cause an erroneous operation of a voice recognizing function.

SUMMARY OF THE INVENTION

Exemplary embodiments of the present invention have been made in an effort to provide a voice signal processing apparatus, a voice signal processing method, and a terminal which may transmit an auxiliary signal for a voice recognition processing to an external terminal without additionally changing hardware.

Exemplary embodiments of the present invention have been made in an effort to further provide a voice signal processing apparatus, a voice signal processing method, and a terminal which may improve accuracy of voice recognition.

Technical objects of the present invention are not limited to the aforementioned technical objects and other technical objects which are not mentioned will be apparently appreciated by those skilled in the art from the following description.

An exemplary embodiment of the present invention provides a voice signal processing apparatus, including: an input unit which receives a voice signal of a user; a detecting unit which detects an auxiliary signal; and a signal processing unit which transmits the voice signal to an external terminal in a first operation mode and transmits the voice signal and the auxiliary signal to the external terminal using the same protocol or different protocols in a second operation mode.

In an exemplary embodiment, the auxiliary signal may be a signal which is used to perform a voice recognition processing on the voice signal.

In an exemplary embodiment, the signal processing unit may transmit the voice signal to the external terminal based on a handsfree profile (HFP) and transmit the auxiliary signal to the external terminal based on a Bluetooth low energy (BLE) in the second operation mode.

In an exemplary embodiment, the processing unit may generate an integrated signal by combining the voice signal and the auxiliary signal in the second operation mode and transmit irate rated signal to the external terminal based on a handsfree profile.

In an exemplary embodiment, the detecting unit may include at least one of an in-ear microphone, a bone conduction microphone, a motion sensor, and a gyro sensor.

In an exemplary embodiment, when the detecting unit is the in-ear microphone or the bone conduction microphone and a level of the auxiliary signal is equal to or higher than a reference level, the signal processing unit may transmit the auxiliary signal to the external terminal.

In an exemplary embodiment, the apparatus may further include a communication unit which transmits the voice signal or the auxiliary signal to the external terminal and the communication unit include a Bluetooth communication module.

In an exemplary embodiment, the apparatus may further include a switch which receives the first operation mode or the second operation mode from the user.

In an exemplary embodiment, the switch may receive whether to transmit the voice signal and the auxiliary signal the external terminal using the same protocol or transmit the voice signal and the auxiliary signal using different protocols to the external terminal in the second operation node.

Another exemplary embodiment of the present invention provides a voice signal processing method, including: receiving a voice signal of a user; detecting an auxiliary signal; selecting an operation mode; and transmitting the voice signal to an external terminal when a first operation mode is selected and transmitting the voice signal and the auxiliary signal to the external terminal using the same or different protocols when a second operation mode is selected.

In an exemplary embodiment, the transmitting of the voice signal to the external terminal when the first operation mode is selected and the transmitting of the voice signal and the auxiliary signal to the external terminal using the same or different protocols when the second operation mode is selected may include receiving whether to transmit the voice signal and the auxiliary signal to the external terminal using the same protocol or transmit the voice signal and the auxiliary signal to the external terminal using different protocols in the second operation mode.

In an exemplary embodiment, the auxiliary signal may be a signal which is used to perform the voice recognition processing on the voice signal.

In an exemplary embodiment, the transmitting of the voice signal to the external terminal when the first operation mode is selected and the transmitting of the voice signal and the auxiliary signal to the external terminal using the same or different protocols when the second operation mode is selected may include transmitting the voice signal to the external terminal based on a handsfree profile (HFP) and transmitting the auxiliary signal to the external terminal based on a Bluetooth low energy (BLE) in the second operation mode.

In an exemplary embodiment, the transmitting of the voice signal to the external terminal when the first operation mode is selected and the transmitting of the voice signal and the auxiliary signal to the external terminal using the same or different protocols when the second operation mode is selected may include generating an integrated signal by combining the voice signal and the auxiliary signal in the second operation mode and transmitting the integrated signal to the external terminal based on a handsfree profile.

Yet another exemplary embodiment of the present invention provides a terminal, including: a communication unit which receives a voice signal and an auxiliary signal; and a voice recognition processing unit which distinguishes a voice section of a user included in the voice signal using the auxiliary signal and performs a voice recognition processing using the voice section.

In an exemplary embodiment, the auxiliary signal may be a signal which is detected through an in-ear microphone or a bone conduction microphone and the voice recognition processing unit may perform a voice recognition processing using a voice section corresponding to a section where a level of the auxiliary signal is equal to or higher than a reference level, in the voice signal.

The voice signal processing apparatus, the voice signal processing method, and the terminal according to exemplary embodiments of the present invention may transmit an auxiliary signal for a voice recognition processing to an external terminal without additionally changing hardware.

The voice signal processing apparatus, the voice signal processing method, and the terminal according to exemplary embodiments of the present invention may improve precision of voice recognition.

Figure 1:
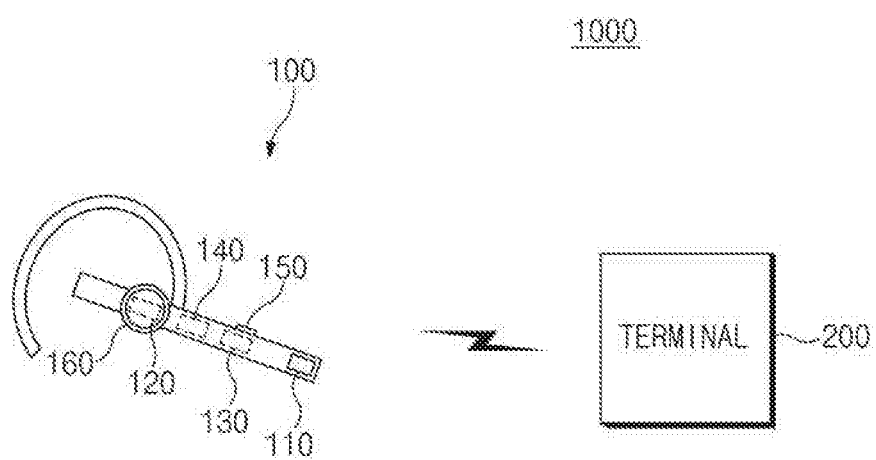
FIG. 1 illustrates a voice recognition processing system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the accompanying drawings. When reference numerals denote components in the drawings, even though the like components are illustrated in different drawings, it should be understood that like reference numerals refer to the same components. In describing the embodiments of the present invention, when it is determined that the detailed description of the known configuration or function related to the present invention may obscure the understanding of exemplary embodiments of the present invention, the detailed description thereof will be omitted.

In describing components of the exemplary embodiment of the present invention, terminologies such as first, second, A, B, (a), (b), and the like may be used. However, such terminologies are used only to distinguish a component from another component but nature, a sequence or an order of the component is not limited by the terminologies. If not contrarily defined, all terminologies used herein including technological or scientific terms have the same meaning as those generally understood by a person with ordinary skill in the art. Terminologies which are defined in a generally used dictionary should be interpreted to have the same meaning as the meaning in the context of the related art but are not interpreted as ideal or excessively formal meaning if they are not clearly defined in the present invention.

Figure 2:
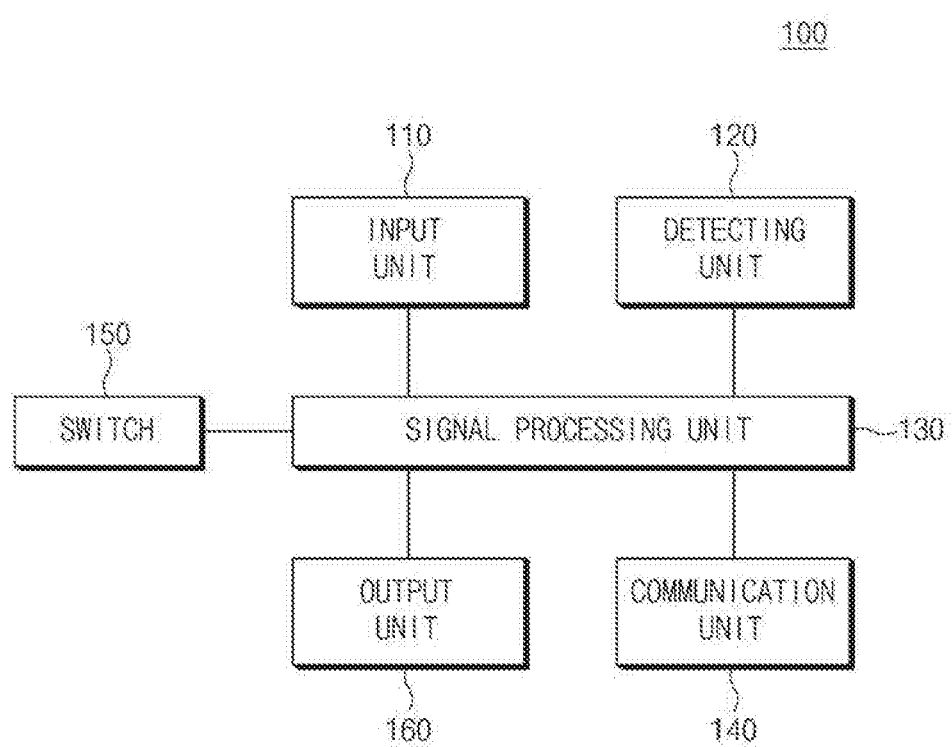
FIG. 2 is a block diagram illustrating a voice signal processing apparatus according to an exemplary embodiment of the present invention.

FIG. 1 illustrates a voice recognition processing system according to an exemplary embodiment of the present invention. FIG. 2 is a block diagram illustrating a voice signal processing apparatus according to an exemplary embodiment of the present invention.

Referring to FIG. 1, a voice recognition processing system 1000 according to an exemplary embodiment of the present invention recognizes a voice of a user to translate the voice into another language or provide functions such as device control. To this end, the voice recognition processing system 1000 may include a voice signal processing apparatus 100 and a terminal 200. However, in FIG. 1, a voice signal processing apparatus 100 which receives a voice of the user and a terminal 200 which processes the voice recognition are functionally distinguished, but the present invention is not limited thereto. The voice signal processing apparatus 100 and the terminal 200 may be integrated as one piece of electronic equipment.

The voice signal processing apparatus 100 may transmit a voice signal input from the user to the terminal 200. For example, the voice signal processing apparatus 100 may be a Bluetooth handsfree device and is wearable in an ear of the user. Further, the voice signal processing apparatus 100 may transmit an auxiliary signal which is used to distinguish a voice section for performing a voice recognition processing on a voice signal to the terminal 200.

The voice signal processing apparatus 100 may transmit the voice signal and/or the auxiliary signal to the terminal 200 in accordance with an operation mode. For example, the operation mode may be set by the user. The voice signal processing apparatus 100 may transmit only the voice signal to the terminal 200 in a first operation mode. In a second operation mode, the voice signal processing apparatus 100 transmits the voice signal and the auxiliary signal to the terminal 200. In this case, the voice signal processing apparatus 100 may transmit the voice signal and the auxiliary signal to the terminal 200 using the same protocol or different protocols. For example, when the voice signal and the auxiliary signal are transmitted to the terminal 200 using the same protocol, the voice signal processing apparatus 100 combines the voice signal and the auxiliary signal to generate an integrated signal and transmits the generated integrated signal to the terminal 200. The protocol may include a Bluetooth handsfree profile and a Bluetooth low energy (BLE) protocol.

As described above, the voice signal processing apparatus 100 may transmit the voice signal and the auxiliary signal to the terminal 200 through the same protocol or different protocols in accordance with the operation mode. When the voice signal and the auxiliary signal are transmitted to the terminal 200 through the same protocol, the voice signal processing apparatus 100 combines the voice signal and the auxiliary signal to transmit the integrated signal to the terminal 200 based on an existing protocol (for example, a Bluetooth handsfree profile (HFP) of transmitting a voice signal. Therefore, the auxiliary signal for performing a voice recognition processing may be transmitted to the terminal 200 without additionally changing the hardware and the handsfree operation of the voice signal processing 100 may be never restricted. The voice signal processing apparatus 100 may be described in more detail with reference to FIG. 2.

Referring to FIGS. 1 and 2, the voice signal processing apparatus 100 may include an input unit 110, a detecting unit 120, a signal processing unit 130, communication unit 140, a switch 150, and an output unit 160.

The input unit 110 may receive a voice signal from the user. For example, the input unit 110 may be a mono microphone, but is not limited thereto.

The detecting unit 120 may detect an auxiliary signal. Here, the auxiliary signal may refer to a signal which is used to distinguish a voice section for performing a voice recognition processing on a voice signal of the user. For example, the detecting unit 120 may include at least one of an in-ear microphone, a bone conduction microphone, a motion sensor, and a gyro sensor.

For example, when the detecting unit 120 is an in-ear microphone or a bone conduction microphone, the detecting unit 120 may be disposed in the ear of the user or close to a temple. When the user speaks, the detecting unit 120 may detect the voice signal of the user. From this viewpoint, the auxiliary signal may refer to a voice signal of the user which is detected by the detecting unit 120. That is, differently from the input unit 110, a voice signal which is relatively less affected by the ambient noise is input to the detecting unit 120, so that the detecting unit 120 may be effectively used to distinguish the voice section of the voice signal of the user.

For example, when the detecting unit 120 is a motion sensor or a gyro sensor, if the user speaks, the detecting unit 120 may detect a generated motion. From this viewpoint, the auxiliary signal may refer to the motion of the user which is detected by the detecting unit 120. That is, the detecting unit 120 detects the motion caused by the speaking of the user, so that the detecting unit 120 may be effectively used to distinguish the voice section of the voice signal of the user.

The signal processing unit 130 may transmit the voice signal and/or the auxiliary signal to the terminal 200 in accordance with the operation mode. For example, the operation mode may be set by the user and include a first operation mode and a second operation mode. When a level of the auxiliary signal is equal to or higher than a reference level, the signal processing unit 130 may transmit the auxiliary signal to the terminal 200.

The signal processing unit 130 may transmit only the voice signal to the terminal 200 based on the Bluetooth handsfree profile (HFP) in the first operation mode. The signal processing unit 130 transmits the voice signal and the auxiliary signal to the terminal 200 in the second operation mode. In this case, the signal processing unit 130 transmits the voice signal and the auxiliary signal to the terminal 200 using the same protocol or different protocols. The protocol may include a Bluetooth handsfree profile (HFP) and a Bluetooth low energy (BLE) protocol.

For example, when the signal processing unit 130 transmits the voice signal and the auxiliary signal to the terminal 200 using the different protocols, the signal processing unit 130 transmits the voice signal to the terminal 200 based on the Bluetooth handsfree profile (HFP) and transmits the auxiliary signal to the terminal 200 based on the Bluetooth low energy (BLE) protocol. Further, for example, when the voice signal and the auxiliary signal are transmitted to the terminal 200 using the same protocol, the signal processing unit 130 combines the voice signal and the auxiliary signal to generate an integrated signal and transmits the integrated signal to the terminal 200 based on the Bluetooth handsfree profile (HFP). For example, the integrated signal may be transmitted such that a voice signal and an auxiliary signal are alternately transmitted to the terminal 200 with a predetermined time interval.

The communication unit 140 may transmit the voice signal and/or the auxiliary signal to the terminal 200 in accordance with the control of the signal processing unit 130. Further, the communication unit 140 may receive voice/sound output data from the terminal 200. The received data may be output to the output unit 160 through the signal processing unit 130. For example, the communication unit 140 may include a Bluetooth communication module.

The switch 150 may receive the first operation mode or the second operation mode from the user. Further, the switch 150 may receive whether to transmit the voice signal and the auxiliary signal to the terminal 200 using the same protocol (single) or different protocols (individual) in the second operation mode from the user.

The output unit 160 may output data/signal transmitted from the signal processing unit 130. For example, the output unit 160 may be an earphone, but is not limited thereto.

Referring to FIG. 1 again, the terminal 200 may perform the voice recognition processing on the voice signal transmitted from the voice signal processing apparatus 100. The terminal 200 distinguishes the voice section of the user which is included in the voice signal using the auxiliary signal transmitted from the voice signal processing apparatus 100 and performs the voice recognition processing using the distinguished voice section.

Therefore, the terminal 200 may more accurately distinguish the voice section of the user. Therefore, the accuracy of the voice recognition may be improved. An operation of the terminal 200 may be described in more detail with reference to FIGS. 4 and 5.

Figure 3:
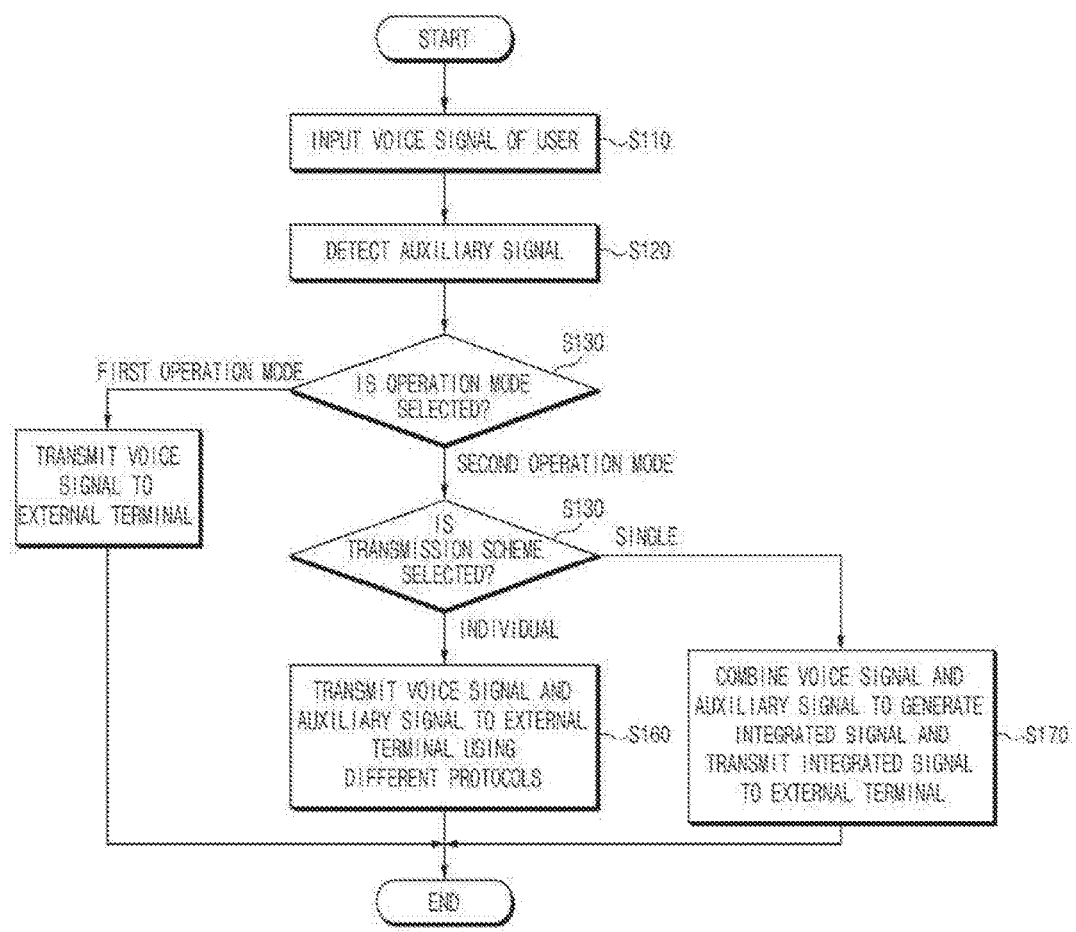
FIG. 3 is a flowchart illustrating a voice signal processing method according to an exemplary embodiment of the present invention.

FIG. 3 is a flowchart illustrating a voice signal processing method according to an exemplary embodiment of the present invention.

Referring to FIG. 3, a voice signal processing method according to an exemplary embodiment of the present invention includes a step of receiving a voice signal of a user, a step S120 of detecting an auxiliary signal, a step S130 of selecting an operation mode, a step S140 of transmitting the voice signal to an external terminal when a first operation mode is selected, a step S150 of selecting a transmission scheme when a second operation mode is selected, a step S160 of transmitting the voice signal and the auxiliary signal to a terminal 200 using different protocols when individual transmission is selected, and a step S170 of generating an integrated signal by combining the voice signal and the auxiliary signal when single transmission is selected and transmitting the integrated signal to the external terminal.

Hereinafter, steps S110 to S170 will be described in more detail with reference to FIGS. 1 and 2.

In step S110, the input unit 110 may receive a voice signal from the user. For example, the input unit 110 may be a mono microphone, but is not limited thereto.

In step S120, the detecting unit 120 may detect an auxiliary signal. Here, the auxiliary signal may refer to a signal which is used to distinguish a voice section for performing a voice recognition processing on a voice signal of the user. For example, the detecting unit 120 may include at least one of an in-ear microphone, a bone conduction microphone, a motion sensor, and a gyro sensor. Step S120 and step S110 may be simultaneously performed.

For example, when the detecting unit 120 is an in-ear microphone or a bone conduction microphone, the detecting unit 120 may be disposed in the ear of the user or close to a temple. When the user speaks, the detecting unit 120 detects the voice signal of the user. From this viewpoint, the auxiliary signal may refer to a voice signal of the user which is detected by the detecting unit 120. That is, differently from the input unit 110, a voice signal which is relatively less affected by the ambient noise is input to the detecting unit 120, so that the detecting unit 120 may be effectively used to distinguish the voice section of the voice signal of the user.

For example, when the detecting unit 120 is a motion sensor or a gyro sensor, if the user speaks, the detecting unit 120 may detect a generated motion. From this viewpoint, the auxiliary signal may refer to the motion of the user which is detected by the detecting unit 120. That is, the detecting unit 120 detects the motion caused by the speaking of the user, so that the detecting unit 120 in may be effectively used to distinguish the voice section of the voice signal of the user.

In step S130, the switch 150 may receive the first operation mode or the second operation mode from the user.

In step S140, the signal processing unit 130 may transmit only the voice signal to the terminal 200 based on the Bluetooth handsfree profile (HFP) in the first operation mode.

In step S150, the switch 150 may receive whether to transmit the voice signal and the auxiliary signal to the terminal 200 using the same protocol (single) or different protocols (individual) in the second operation mode from the user.

In step S160, the signal processing unit 130 transmits the voice signal to the terminal 200 based on the Bluetooth handsfree profile (HFP) and transmits the auxiliary signal to the terminal 200 based on the Bluetooth low energy (BLE).

In step S170, the signal processing unit 130 combines the voice signal and the auxiliary signal to generate an integrated signal and transmits the generated integrated signal to the terminal 200 based on the Bluetooth handsfree profile (HFP).

Figure 4:
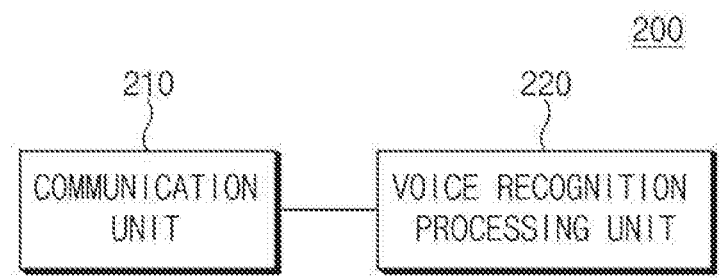
FIG. 4 is a block diagram illustrating a terminal according to an exemplary embodiment of the present invention.
Figure 5:
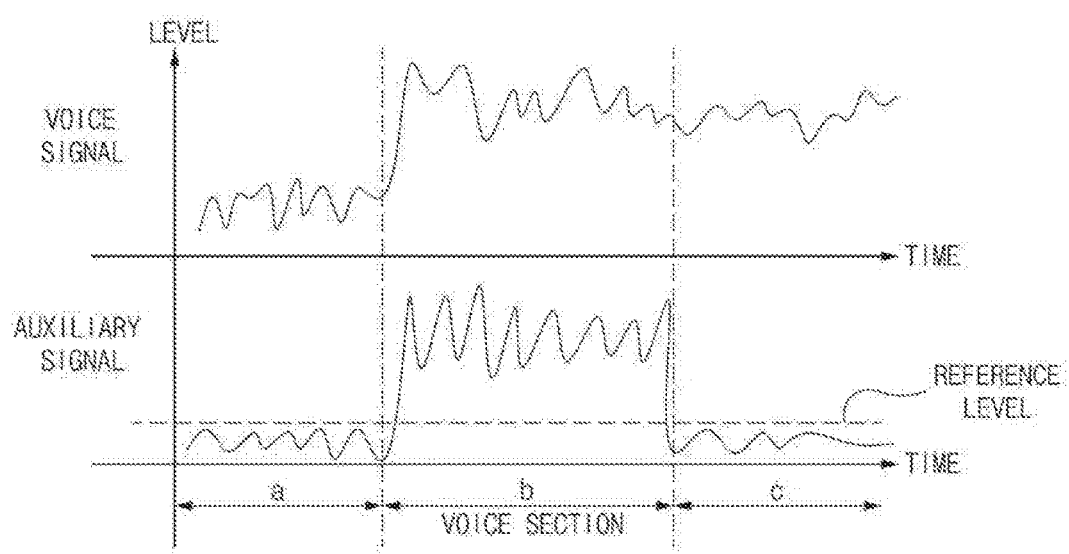
FIG. 5 is a view explaining a voice recognition processing operation of a terminal according to an exemplary embodiment of the present invention.

FIG. 4 is a block diagram illustrating a terminal according to an exemplary embodiment of the present invention. FIG. 5 is a view explaining a voice recognition processing operation of the terminal according to an exemplary embodiment of the present invention.

Referring to FIG. 4, a terminal 200 may include a communication unit 210 and a voice recognition processing unit 210.

The communication unit 210 may receive a voice signal and an auxiliary signal from the voice signal processing apparatus 100. Further, the communication unit 210 may transmit vice sound output data to the voice signal processing apparatus 100. For example, the communication unit 210 may include a Bluetooth communication module.

The voice recognition processing unit 220 distinguishes the voice section of the user included in the voice signal using an auxiliary signal and performs the voice recognition processing using the distinguished voice section.

Referring to FIG. 5, the voice recognition processing unit 220 may distinguish the voice section of the voice signal using the auxiliary signal. For example, the voice recognition processing unit 220 distinguishes a section b corresponding to a section where a level of the auxiliary signal is equal to or higher than a reference level as a voice section of the voice signal and performs the voice recognition processing using the distinguish voice section. In contrast, the voice recognition processing unit 220 distinguishes that a section a or c corresponding to a section where the level of the auxiliary signal is lower than the reference level is not a voice section of the voice signal.

As described above, the auxiliary signal is a signal obtained by detecting a voice signal which is relatively less affected by the ambient noise or motion caused by the speaking of the user. Therefore, the auxiliary signal used to accurately distinguish the voice section of the voice signal and thus the accuracy of the voice recognition is improved.

It will be appreciated that various exemplary embodiments of the present invention have been described herein for purposes of illustration, and that various modifications, changes, and substitutions may be made by those skilled in without departing from the scope and spirit of the present invention.

Therefore, the exemplary embodiments of the present invention provided for illustrative purposes only but not intended to limit the technical spirit of the present invention. The scope of the technical concept of the present invention is not limited thereto. The protective scope of the present invention should be construed based on the following claims, and all the technical concepts equivalent scope thereof should be construed as falling within the scope of the present invention.

What is claimed is:

1. A voice signal processing apparatus comprising:
a processor; and
one or more units comprising executable code configured and executed by the processor using algorithm associated with a non-transitory storage device,
wherein the one or more units comprise:
an input unit which receives, as a voice signal, a user's voice when the user speaks;
a detecting unit which is disposed in an ear or close to a temple of the user and detects an auxiliary signal from the user's voice when the user speaks, the auxiliary signal being less affected by an ambient noise than the voice signal because the auxiliary signal is detected from the ear or the temple of the user, and thus being used in distinguishing a voice section of the voice signal for voice recognition processing on the voice signal;
a switch which selects a first operation mode or a second operation mode;
a signal processing unit which operates for the voice signal to be transmitted to an external terminal in the first operation mode and operates for the voice signal and the auxiliary signal to be transmitted to the external terminal using a same protocol or different protocols in the second operation mode; and
a communication unit which transmits the voice signal and the auxiliary signal to the external terminal, wherein in the second operation mode, when using the same protocol, the signal processing unit operates to generate an, integrated signal by combining the voice signal and the auxiliary signal to be transmitted to the external terminal, while when using the different protocols, the signal processing unit operates to transmit the voice signal and the auxiliary signal to the external terminal using, the different protocols, and wherein the signal processing unit operates for the communication unit to transmit the auxiliary signal to the external terminal when a level of the auxiliary signal is equal to or higher than a reference level.

2. The voice signal processing apparatus according to claim 1, wherein the signal processing unit transmits the voice signal to the external terminal based on a handsfree profile (HFP) and transmits the auxiliary signal to the external terminal based on a Bluetooth low energy (BLE) in the second operation mode.

3. The voice signal processing apparatus according to claim 1, wherein the signal processing unit transmits the integrated signal to the external terminal based on a handsfree profile.

4. The voice signal processing apparatus according to claim 1, wherein the detecting unit is an in-ear microphone or a bone conduction microphone.

5. The voice signal processing apparatus according to claim 1, wherein the communication unit includes a Bluetooth communication module.

6. The voice signal processing apparatus according to claim 1,
wherein in the second operation mode, the switch further selects whether to transmit the voice signal and the auxiliary signal to the external terminal using the same protocol or whether to transmit the voice signal and the auxiliary signal using the different protocols to the external terminal.

7. A voice signal processing method comprising:
receiving, by an input unit, a voice signal from a user when the user speaks;
detecting, by a detecting unit disposed in an ear or close to a temple of the user, an auxiliary signal from the user's voice when the user speaks, the auxiliary signal being, less affected by an ambient noise than the voice signal because the auxiliary signal is detected from the ear or the temple of the user and thus being used in distinguishing a voice section of the voice signal for voice recognition processing on the voice signal;
selecting, by a signal processing unit, an operation mode between a first operation mode and a second operation mode;
when the first operation mode is selected, transmitting, by the signal processing unit, the voice signal to an external terminal;
when the second operation mode is selected, selecting, by the signal processing unit, whether the voice signal and the auxiliary signal are transmitted to the external terminal using a same protocol or using different protocols; and
when the using of the same protocol is selected, generating, by the signal processing unit, an integrated signal by combining the voice signal and the auxiliary signal and transmitting the integrated signal to the external terminal using the same protocol, while when the using of the different protocols is selected, transmitting, by the signal processing unit, the voice signal and the auxiliary signal to the external terminal using the different protocols,
wherein, in transmitting the voice signal and the auxiliary signal to the external terminal, the auxiliary signal is transmitted to the external terminal when a level of the auxiliary signal is equal to or higher than a reference level, and
wherein the input unit, the detecting unit, and the signal processing unit comprise executable code configured and executed by a processor using algorithm associated with a non-transitory storage device.

8. The voice signal processing method according to claim 7, further comprising: when the using of the same protocol is selected in the second operation mode, transmitting the integrated signal to the external terminal based on a handsfree profile.

9. The voice signal processing method according to claim 7, wherein in the second operation mode, the transmitting of the voice signal to the external terminal is based on a handsfree profile (HFP) and the transmitting of the auxiliary signal to the external terminal is based on a Bluetooth low energy (BLE) in the second operation mode.

* * * * *